PROCESS FOR MAKING BORON NITRIDE FILM CAPACITORS

Filed Dec. 12, 1963 4 Sheets-Sheet 1

INVENTOR.
Robert J. Patterson
Rolf R. Haberecht
E. Mickey Hubbard
Attorney

Dec. 3, 1968 R. J. PATTERSON ET AL 3,414,435

PROCESS FOR MAKING BORON NITRIDE FILM CAPACITORS

Filed Dec. 12, 1963 4 Sheets-Sheet 2

INVENTOR.
Robert J. Patterson
Rolf R. Haberecht
E. Mickey Hubbard
Attorney

PROCESS FOR MAKING BORON NITRIDE FILM CAPACITORS

Filed Dec. 12, 1963 4 Sheets-Sheet 3

INVENTOR.
Robert J. Patterson
Rolf R. Haberecht
E. Mickey Hubbard
Attorney

PROCESS FOR MAKING BORON NITRIDE FILM CAPACITORS

Filed Dec. 12, 1963 4 Sheets-Sheet 4

INVENTOR.
Robert J. Patterson
Rolf R. Haberecht
E Mickey Hubbard
Attorney 3,414,435
Patented Dec. 3, 1968

3,414,435

PROCESS FOR MAKING BORON NITRIDE FILM CAPACITORS

Robert J. Patterson, Dallas, and Rolf R. Haberecht, Richardson, Tex., assignors to Texas Instruments Incorporated, Dallas, Tex., a corporation of Delaware
Filed Dec. 12, 1963, Ser. No. 330,023
16 Claims. (Cl. 117—212)

The present invention relates to electrical capacitors, and more particularly but not by way of limitation, relates to a process for manufacturing single and multilayer having thin films of boron nitride as dielectric capacitors.

It is well-known in the art that capacitance is directly proportional to the area of the opposed electrodes and inversely proportional to the thickness of the dielectric between the electrodes. The voltage at which the capacitor may be operated is determined by the breakdown voltage of the dielectric. Since it is desirable to have capacitors of minimum size but maximum capacitance and maximum breakdown voltage, attempts have been made to produce very thin dielectrics for use in capacitors having high insulation values.

Due to the outstanding dielectric properties of boron nitride, attempts have been made to construct capacitors using pure boron nitride as the dielectric. Substantially all of these attempts have involved what might be termed the "bulk" approach in that the dielectric layer is constructed by working a mass of boron nitride down to a thin sheet. For example, solid boron nitride has been successfully machined down to a thickness on the order of 25 mils and then placed between suitable electrodes such as metal films painted on the opposite surfaces of the thin sheet. Or, powdered boron nitride has been combined with suitable binding material and subjected to high pressure and high temperature to form a relatively thin pressed dielectric sheet.

In the first case, the minimum thickness of the machined boron nitride is limited by the machining process, except when using very costly machining techniques, to a minimum thickness of about 25 mils as compared with an optimum thickness of substantially less than one mil. In the second case, the intermixed binders and other additives appreciably decrease the insulation properties of the boron nitride. Further, the binders produce small zones in which no boron nitride is present. Therefore, as the sheet is pressed thinner, some areas between the electrodes do not have any boron nitride present and the capacitor shorts out or has a low breakdown voltage.

Other attempts to construct very thin film dielectrics for use in capacitors have entailed the production of a metal oxide film or other metal compound film on a metal substrate. While these capacitors are suitable for some purposes, metal ions must diffuse into the metal oxide dielectric being formed in order to carry out the oxidation reaction. This results in a metal ion gradient throughout the film which appreciably reduces the dielectric quality of the film.

More recently, it has been suggested that boron nitride can be deposited directly upon a metal substrate by the thermal decomposition of trichloroborazole and that the boron nitride deposited in this manner could be used for electrical capacitors. However, it has been found that boron nitride cannot be deposited directly upon a metal substrate to produce a thin, continuously dense film which is strongly adherent to the metal substrate so as to be used to manufacture electrical devices, and in particular, the quality and thickness of the film could not be sufficiently controlled for commercial application.

In accordance with the broader aspects of the present invention, a capacitor is constructed by adherently depositing a film of boron nitride from the vapor phase onto a metallic substrate. The film is less than two mils in thickness. The boron nitride film is bonded to the substrate by an interlayer comprised of a compound of the substrate material, and preferably is either a boride or a nitride. Then a metallic film counter electrode is deposited on the boron nitride film which serves as the dielectric. The boron nitride film is very thin, pure, dense, and strongly adherent to the metallic substrate such that very small capacitors having very high capacitance values can be constructed.

The invention also contemplates several novel methods for constructing multilayer capacitors on an economical mass production basis. One such method entails the simultaneous deposition of boron nitride films upon an interlayer on opposite sides of the substrate, then deposition of the metallic film electrodes on each of the boron nitride films. This sequence of steps can be repeated as desired because an interlayer compounded from the metallic film material can be formed to securely bond subsequent boron nitride films to each metallic film electrode.

In accordance with another aspect of the invention, a plurality of boron nitride films of different thicknesses are deposited between metallic film electrodes to produce a highly versatile capacitor.

As mentioned, very thin boron nitride films permit the construction of extremely small capacitors having high capacitance values. However, connecting electrical leads to the appropriate electrodes constitutes a major problem. Therefore, the present invention further contemplates several novel processes using selective etching, masking and abrasive etching for making the necessary electrical connections to the electrodes of capacitors, and in particular to the electrodes of multilayer capacitors.

Specifically, the present invention contemplates that the electrical connections can be made after using selective etching techniques on the boron nitride, the metallic substrate and the electrodes. In this connection, boron nitride has heretofore been considered as substantially stable in all acids and bases and mixtures thereof. However, we have discovered that boron nitride can be etched by hot phosphoric acid, such that a novel selective etching process can be employed as hereafter described in greater detail.

The invention also contemplates a process for making a micro-circuit comprised of a resistor and capacitor connected in series and comprised of a thin metal film, a thin boron nitride dielectric film and a counterelectrode. The thin metal film can be tantalum and serves as both a resistor and an electrode for the capacitor.

Therefore, an important object of this invention is to provide an improved process for manufacturing a miniaturized capacitor having a very thin boron nitride dielectric and substantially improved operating characteristics.

Another object of this invention is to provide a process for manufacturing miniaturized capacitors on an economical, mass production basis.

Still another object of the present invention is to provide a process for manufacturing miniaturized multilayer capacitors on an economical, mass production basis.

Yet another object of this invention is to provide a process for connecting the electrical leads to a small, multilayer boron nitride film capacitor.

Many additional objects and advantages will be evident to those skilled in the art from the following detailed description and drawings, wherein.

In accordance with the present invention, an interlayer is used to chemically bond a thin film or boron nitride to a metal substrate. The interlayer is formed by reacting a reagent with the metal substrate to form a metal boride, metal nitride, metal oxide or other interlayer which will chemically bond with a boron nitride film subsequently deposited on the interlayer. It is believed that such an interlayer can be applied to substantially all refractory metals which will withstand the temperatures used in the process, and is specifically applicable to molybdenum, niobium, tantalum, tungsten and to alloys comprised primarily of these metals, and to certain ferrous base alloys.

In a specific embodiment of the invention, boron is reacted with the metal substrate to produce a metal boride interlayer. The boron may be supplied by reacting boron trichloride vapor with the surface of a heated substrate.

The boron nitride film may be formed by the reaction of boron and nitrogen from any suitable source reagents or a heated substrate upon which an interlayer has been formed. In a specific embodiment, however, the boron nitride film is deposited by the thermal decomposition of beta-trichloroborazole on a heated substrate. Or the boron and nitrogen may be supplied by boron trichloride and ammonia.

The formation of the interlayer and the deposition of the boron nitride film are preferably accomplished in separate steps so that a uniform interlayer is assured over the entire surface to be coated. A uniform boron nitride layer can then be deposited and the thickness of the film rather precisely controlled. However, the two steps can be accomplished simultaneously by supplying a mixture of boron trichloride and trichloroborazole vapors at the surface of a heated substrate. In such a case, the metal boride is formed preferentially to produce the interlayer upon which boron nitride is deposited.

Figure 1:
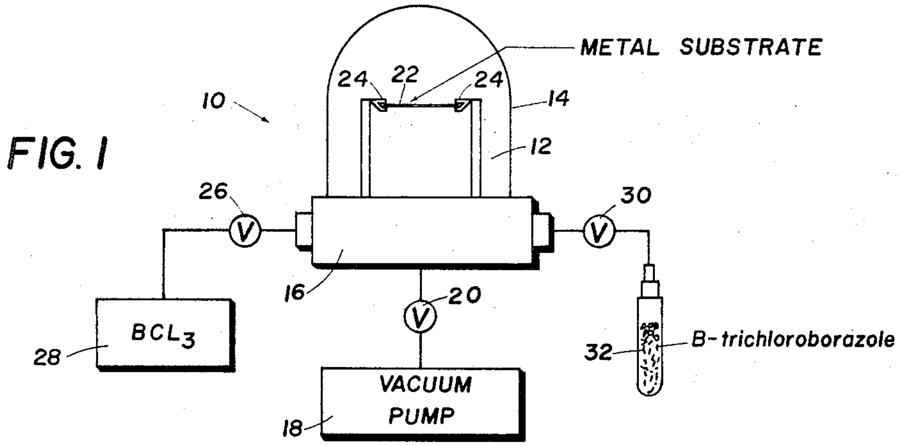
FIGURE 1 is a schematic drawing of an apparatus which may be used to practice the method of the present invention.

A suitable apparatus for performing the process of the present invention is indicated generally by the reference numeral 10 in FIGURE 1. The apparatus 10 comprises a reaction chamber 12 formed by a bell jar 14 and a base 16. The reaction chamber 12 can be evacuated by a suitable pump 18. A valve 20 is provided for sealing the reaction chamber from the pump when desired. A metal or other substrate 22 upon which the boron nitride film is to be deposited is held by suitable clamps 24 through which an electrical current can be passed to heat the substrate. A valve 26 controls the introduction of boron trichloride vapors into the reaction chamber 12 from a suitable boron trichloride source 28. A similar valve 30 controls the introduction of trichloroborazole vapors to the reaction chamber 12 from a trichloroborazole source 32 which may conveniently comprise a vacuum container in which trichloroborazole crystals can be heated and vaporized. In the event boron trichloride and ammonia are used for the deposition of the boron nitride film, the valve 30 can be used to control the introduction of the ammonia or the vapors of the addition compound ammonia-boron trichloride which has been previously formed by a reaction between boron trichloride and ammonia to the reaction chamber 12.

When using the apparatus 10 to practice the process of the present invention, the metal substrate 22 is preferably degreased by a suitable solvent prior to placement in the reaction chamber 12. Next the reaction chamber 12 is evacuated by the pump 18 to a very low pressure, preferably less than about one micron of mercury. The substrate 22 may then be heated in the vacuum to sublimate all volatile impurities which are urged from the system by the vacuum pump 18. Next the reaction chamber 12 is backfilled with boron trichloride from the source 28 to the desired pressure, which is preferably between from 5 and about 100 microns of mercury. The substrate 22 is then resistively heated to a temperature in the range from about 900° C. to about 1300° C. for a short period of time, usually from about 15 to about 60 seconds. During this period the metal boride interlayer is formed upon the surface of the metal substrate 22 by the interaction of the metal and the boron from the boron trichloride vapors.

The reaction chamber 12 is then evacuated to a low pressure of about one micron of mercury in order to remove the remaining boron trichloride vapors and the freed chlorine. The reaction chamber 12 is then backfilled with beta-trichloroborazole vapors to a pressure between about 10 and about 300 microns of mercury. Next the substrate 22 is heated to a temperature between about 900° C. and about 1300° C. until a film of boron nitride of the desired thickness is achieved. A period from about 1 to about 5 minutes is normal. The thickness of the film can be rather precisely determined by controlling the various parameters of pressure, temperature and contact time between the vapors and the substrate. Boron nitride films from 0.2 micron to 5 microns have been prepared. The film can be made so thin and of such uniform thickness as to be substantially one color if the substrate is uniformly heated.

The boron nitride films are chemically stable in a wide variety of corrosive media. Specificaly, the boron nitride films are insoluble in $H_2O$, HCl (dilute and concentrate), $HNO_3$ (dilute and concentrate), $H_2SO_4$ (dilute and concentrate), aqua regia, NaOH, KOH (dilute and concentrate), cryolite mixtures, and HF (dilute and concentrate). The boron nitride films are stable in air up to 700° C., but are unstable above 800° C. after 30 minutes.

However, we have discovered that the boron nitride films are subject to rapid attack by $H_3PO_4$ at about 295° C. This unique feature permits selective etching of the boron nitride to facilitate the construction of the capacitor as will hereafter be described in greater detail. In a specific example, a strip of molybdenum coated with a boron nitride film deposited in accordance with the present invention and a second weighed strip of molybdenum were placed in a solution of $H_3PO_4$ that had been boiled until bubbles had quit coming up and which was at approximately 295° C. The strips were held in the $H_3PO_4$ solution about five minutes before being removed and washed. The boron nitride film was removed from the molybdenum strip and electrical conductance by point contact to the strip was good. The other weighed strip of molybdenum experienced no weight loss, indicating that molybdenum is stable in the hot $H_3PO_4$.

A novel and highly useful electrical capacitor is manufactured by depositing a very thin boron nitride film on a metal substrate using the interlayer to chemically bond the film to the substrate as above described, and then depositing a metallic counterelectrode on the dielectric boron nitride film.

Figure 3:
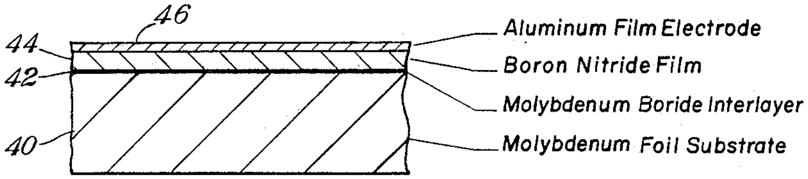
FIGURE 3 is an enlarged, partial sectional view of a capacitor constructed in accordance with the present invention.
Figures 4, 9, 10:
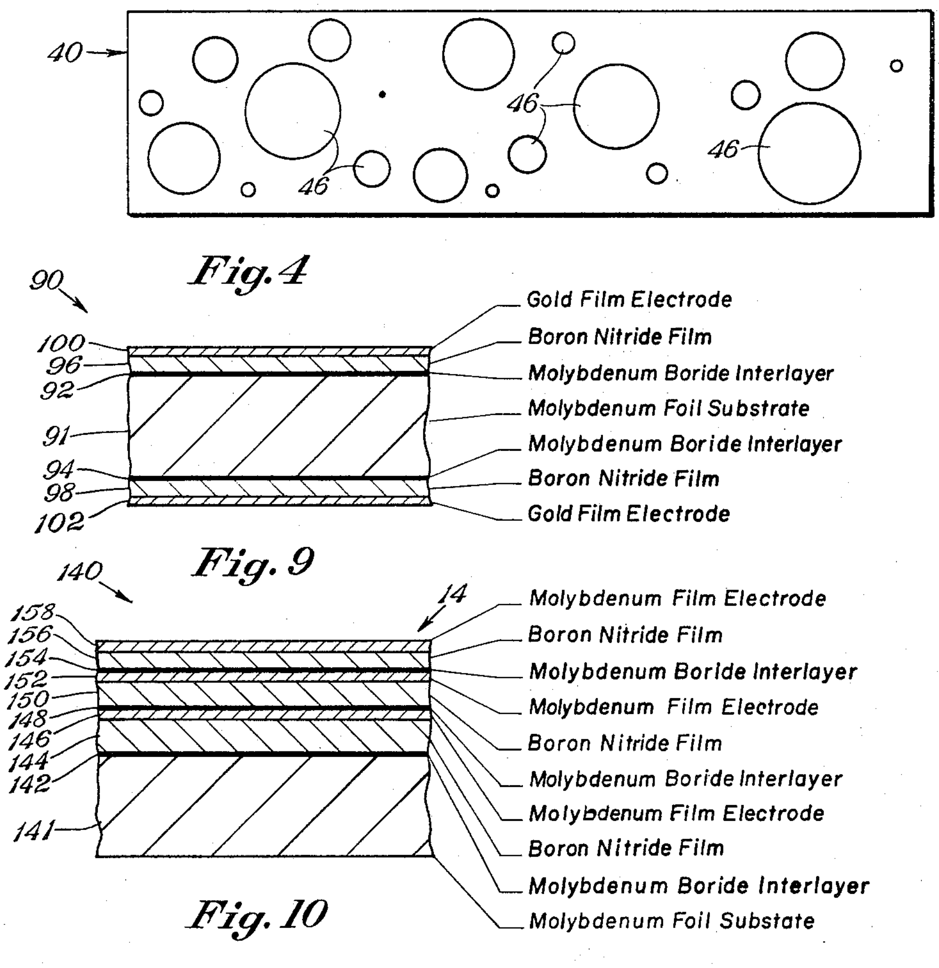
FIGURE 4 is a somewhat schematic plan view which serves to illustrate the manner in which the results of the method of the present invention were tested.
FIGURE 9 is an enlarged partial sectional view of still another capacitor constructed in accordance with the present invention.
FIGURE 10 is an enlarged partial sectional view of still another capacitor constructed in accordance with the present invention.

In order to test the continuity and uniformity of a boron nitride film and to construct a capacitor, a molybdenum foil substrate 40 (FIGURE 3) was placed in the reaction chamber 12. A molybdenum boride interlayer 42 and a boron nitride film 44 were then deposited on the molybdenum substrate using the process described above. A series of randomly-placed aluminum electrodes 46 of progressively increasing diameters as illustrated in FIGURE 4 were then vacuum-evaporated onto the surface of the boron nitride film using conventional techniques. The aluminum film electrodes 46 had successively increasing areas up to 1.208 square inches. The breakdown voltage of the boron nitride film between each of the electrodes 46 and the metal substrate was uniformly about 500 volts DC. This indicates that the boron nitride is very uniform and continuously dense over the entire substrate because any defect in the boron nitride film under any electrode would result in a decerase in the breakdown voltage.

Further tests of capacitors constructed in accordance with the present invention indicated that a 0.5 micron thick boron nitride film has a dielectric strength of 5000 DC volts per mil ($2\times10^6$ DC volts per centimeter) and a dielectric constant of 4.4. Thus a boron nitride film one micron thick can be expected to have a breakdown voltage of 200 DC volts and a capacitance of 25,000 micromicrofarads per square inch. The DC voltage breakdown tests referred to above correspond to Method 301 of the procedures outlined in Mil-std-202 and represent the ability of the boron nitride film to withstand an impressed DC voltage over a period in excess of one minute.

Figure 5:
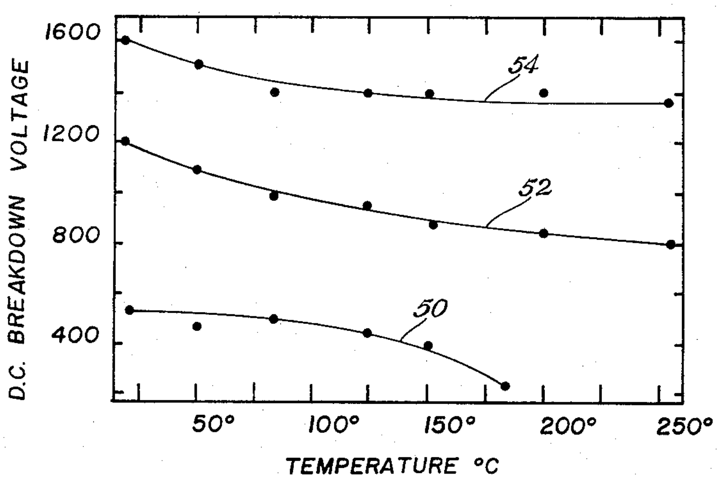
FIGURE 5 is a graph illustrating an operating characteristic of three capacitors constructed in accordance with the present invention.

The variations in breakdown voltage for three separate capacitors constructed in accordance with the present invention are represented by the curves 50, 52 and 54 on the graph of FIGURE 5. The boron nitride film of the capacitor represented by the curve 52 was thicker than the boron nitride coating of the capacitor represented by the curve 50, and the boron nitride film of the capacitor represented by the curve 54 was still thicker. The voltage measurements were made in a dry nitrogen ambient by making a point contact to the aluminum film electrode deposited on the boron nitride film. Considering some inaccuracies in the breakdown voltage measurements, it will be evident that no large changes in the rate of degradation of the breakdown voltages with temperature occurs with decreasing film thickneses up to about 150° C. where the breakdown voltage of the capacitor having the thinnest boron nitride film represented by curve 50 begins to decrease at a greater rate. In other words, the slopes of the curves 50, 52 and 54 are substantially the same constant value except for the curve 50 above 150° C. Considering some inaccuracies in the test measurement, this indicates that the rate of degradation for the thinnest boron nitride film might increase more rapidly above 150° C., whereas no change is apparent in the thicker boron nitride films represented by the curves 52 and 54.

Figure 6:
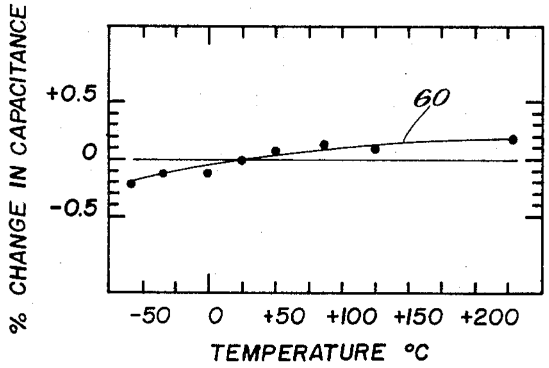
FIGURE 6 is a graph illustrating another operating characteristic of a capacitor constructed in accordance with the present invention.

Referring now to FIGURE 6, the curve 60 represents the percent change in capacitance with respect to temperature of five randomly-selected capacitor assemblies selected from a group constructed by encapsulating a sandwich of molybdenum substrate, metal boride interlayer, boron nitride film and aluminum film electrode in transistor cans or in glass in conventional manner. The assemblies rather uniformly had capacitance values of 320 micromicrofarads and 200 volts breakdown. The temperature coefficients calculated from the curve 60 are −25 p.p.m./° C. at −55° C., +17 p.p.m./° C. at 85° C., +10 p.pm/° C at 125° C, and +16 pp.m./° C. at 250° C. The overall accuracy of the capacitance measurements are approximately ±0.2 micromicrofarads or ±5–10 p.p.m./° C. No change in capacitance was detectable between 200 and 250° C. From the above data, it will be evident to those skilled in the art that capacitors constructed in accordance with the present invention have an exceptional temperature stability.

The dissipation factors of a random group of 13 capacitor assemblies were measured to be in the range of 0.01% at 1 kc. The boron nitride capacitors which were carefully encapsulated in glass envelopes did not exhibit any change in the dissipation factor with temperature in the range measured, which was up to 175° C. Other capacitors encapsulated in transistor cans exhibited a slight increase in the dissipation factor, but even these compared very favorably with electrostatic precision units presently on the market.

Figure 8:
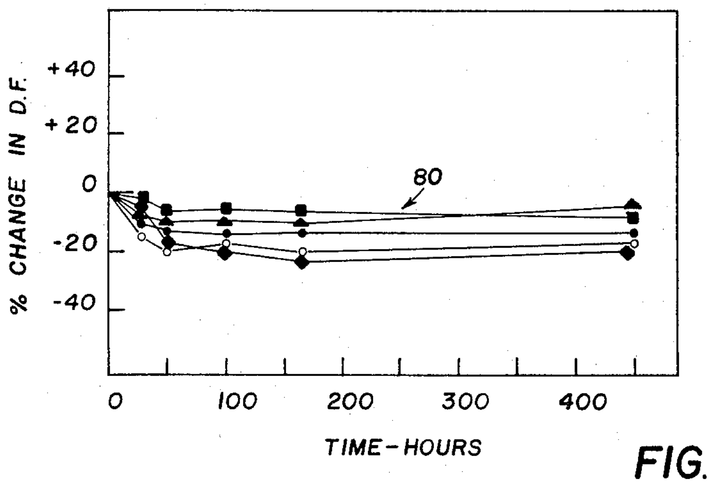
FIGURE 8 is a graph illustrating yet another operating characteristic of the five capacitors constructed in accordance with the present invention.
Figure 2:
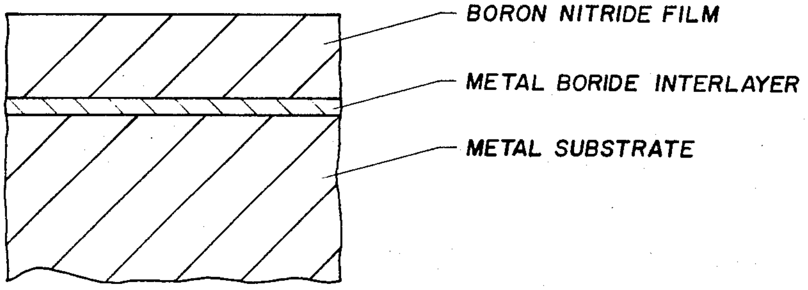
FIGURE 2 is an enlarged, schematic, partial sectional view of an article of manufacture constructed in accordance with this invention which also serves to illustrate the method of the present invention.
Figure 7:
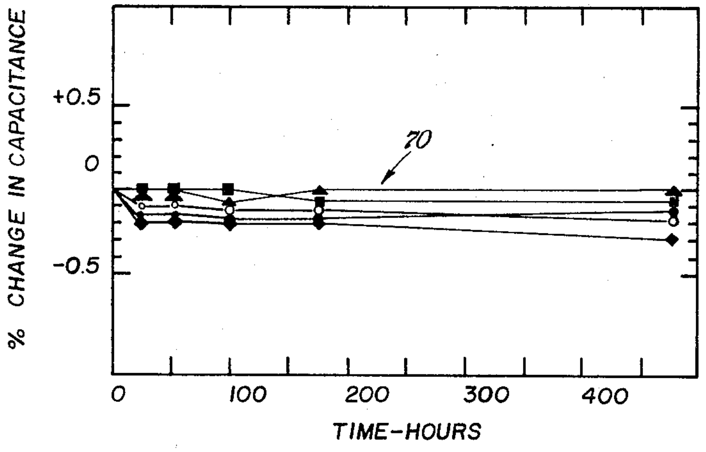
FIGURE 7 is a graph illustrating still another operating characteristic of five capacitors constructed in accordance with the present invention.

Five capacitors constructed in accordance with the present invention were tested over extended periods of time to determine the percent change in capacitance of each and the percent change in the dissipation factor of each. The changes in the capacitance of each of the units are presented by one of the curves indicated collectively by the reference numeral 70 in the graph of FIGURE 7. The changes in the dissipation factors of the corresponding capacitors are represented by the curves indicated collectively by the reference numeral 80 in the graph of FIGURE 8. The graphs include only data obtained over 450 hours, but the units exhibited no further change in capacitance over the period tested which was in excess of 1000 hours. It will be noted that the average capacitance change is approximately the same at 0 volts DC as at 75 volts DC, which indicates that no deterioration is caused by voltage stress. It will be noted in FIGURE 8 that an appreciable change in the dissipation factor occurred during the first 24 hours, but a definite tendency towards stabilization was subsequently exhibited. It is believed that this initial effect was caused primarily by small quantities of moisture remaining in the encapsulation ambient which subsequently dissipated, or may have been caused by electrode deterioration.

Another important aspect of the present invention is illustrated by the novel capacitor construction indicated generally by the reference numeral 90 in FIGURE 9. A metal foil substrate 91 is placed in a reaction chamber such as the chamber 12, and suitable interlayers 92 and 94 are simultaneously formed on the opposite surfaces of the foil using the process heretofore described. In the particular embodiment illustrated, the substrate 91 is molybdenum and the bonding interlayers are molybdenum boride. Boron nitride films 96 and 98 are then simultaneously deposited upon the metal boride interlayers 92 and 94, respectively, using the process heretofore described. Metallic film electrodes 100 and 102 are then deposited on the boron nitride films by any suitable technique, but preferably by vapor condensation, to produce the multilayer capacitor 90. The metallic films are preferably of a metal different from the substrate 91, such as gold, so that the two metals can be selectively etched as will hereafter be described. Electrical contact can be made with the electrodes individually and thereby produce two separate capacitors, or the metal film electrodes 100 and 102 can be electrically interconnected to provide a single capacitor having twice the capacitance for a given area of substrate.

Figures 11, 12:
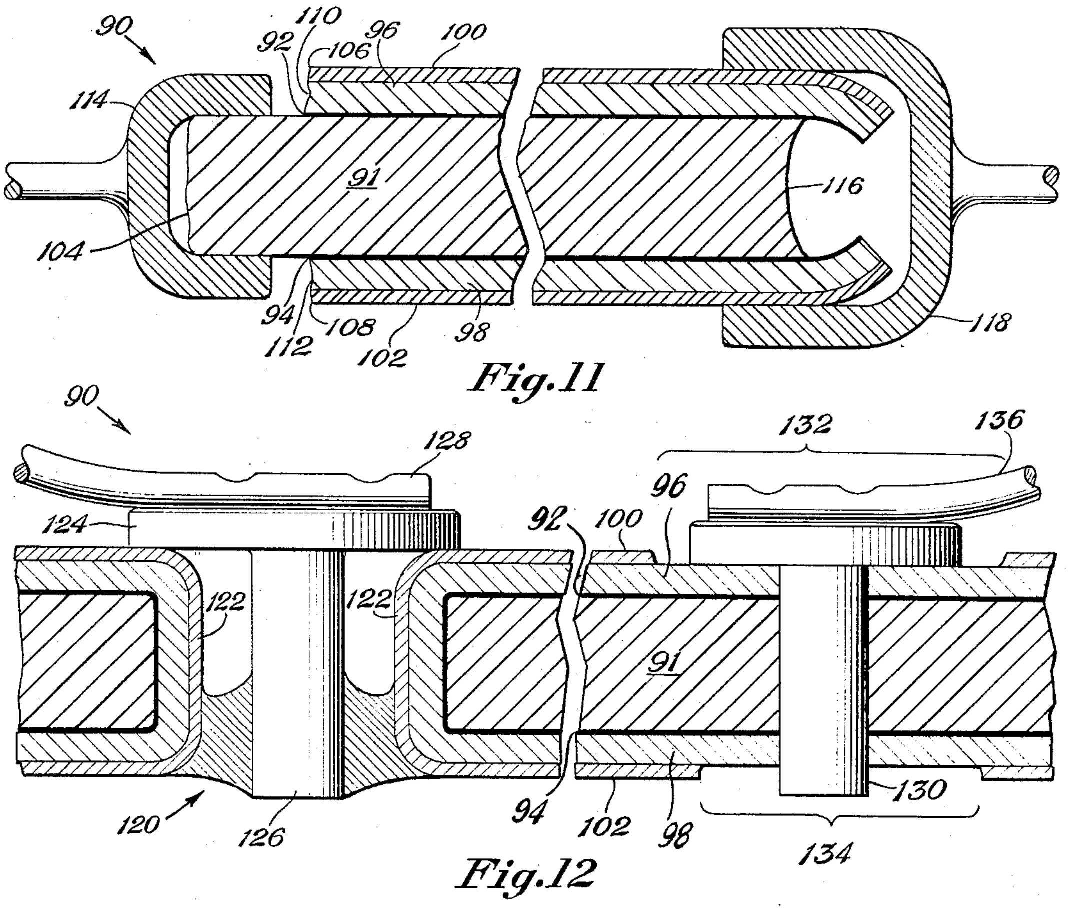
FIGURE 11 is a broken, enlarged sectional view illustrating the manner in which electrical connections can be made to the electrodes of the capacitor shown in FIGURE 9.
FIGURE 12 is a broken, enlarged sectional view of another manner in which electrical connections can be made to the electrodes of the capacitor shown in FIGURE 9.

It will be appreciated that the capacitor construction 90 is paper thin and that making separate electrical contact with the electrodes creates a considerable problem. The electrical connections to the multilayer capacitor 90 can be made by either of two methods, the first of which is illustrated in FIGURE 11. The metal foil substrate 91 is cut up into small pieces having the desired area. This leaves a sandwich construction having relatively square peripheral edges. As previously mentioned, when the etching technique is to be employed, the metal film electrodes 100 and 102 will usually be a metal different from the metal foil substrate 91. For example, the substrate 91 may be molybdenum and the metal film electrodes 100 and 102 gold, so that the two metals will not be attacked by the same etchants. Then the edge of the sandwich construction is dipped in a suitable etchant such as a solution of HCl-$HNO_3$ having a high concentration of HCl. The relatively thin gold film electrodes 100 and 102 will be rapidly etched away relative to the rate at which the edge of the molybdenum substrate 91 will be attacked. For example, the molybdenum substrate 91 will be etched back to the point 104 and the gold film electrodes will be etched back to the points 106 and 108. The boron nitride films 96 and 98 may then be etched back to the points 110 and 112, for example, by a solution of hot $H_3PO_4$ as previously described. A clip 114 can then be connected to the exposed edge of the substrate 91 by conventional welding techniques.

Another edge of the sandwich is then immersed in a suitable etchant which will selectively attack the molybdenum substrate 91 but will not affect the boron nitride films 96 or 98 or the gold film electrodes 100 and 102 so that the substrate 91 is removed back to point 116. For example, a solution of HCl-$HNO_3$ having a very low concentration of HCl will attack the molybdenum at a much greater rate than the gold and will not attack the boron nitride. The electrodes 100 and 102 will tend to hold the otherwise fragile boron nitride films 96 and 98 intact and the free edges of the films will tend to come together as illustrated in FIGURE 11 to cover the edge of the substrate. Then a clip 118 can be crimped over the edge of the sandwich and preferably welded to the metal films 100 and 102. The boron nitride covering the edge of the substrate 91 insures that the clip 118 does not contact the substrate. The capacitor can then be encapsulated in a suitable insulating material.

An alternate technique for making contact with the electrodes of the multilayer capacitor construction 90 is illustrated in FIGURE 12. When using this technique, an aperture indicated generally by the reference numeral 120 is punched in the metal foil substrate 91 prior to deposition of the various layers. The metal boride interlayers 92 and 94, and the boron nitride films 96 and 98 will come together and cover the edge of the substrate 91 around the edge of the aperture 120. Then when the metal film electrodes 100 and 102 are deposited, a film 122 will also coat the edge of the aperture and provide electrical contact between the two electrodes 100 and 102. A suitable metal tack 124 may then be inserted through the aperture 120 and welded by conventional techniques to the metal film electrode 100. If for some reason the metal film around the periphery of the aperture 120 does not provide sufficient electrical contact between the two electrodes 100 and 102, the other end 126 of the tack 124 can also be welded or otherwise connected to the metal film electrode 102. A suitable lead wire 128 can then be welded to the tack 124.

Electrical connection is made to the substrate 91 by means of a second tack 130. The metal film electrodes 100 and 102 are either etched away in the areas 132 and 134 or the areas are masked prior to deposition of the electrodes to insure that the tack 130 does not make contact with either. Then the tack 130 is merely coated with suitable weld material, pressed through the metal foil substrate in the boron nitride films 96 and 98, and the device is heated to fuse the weld material and weld the tack 130 to the substrate 91. A suitable lead wire 136 can then be welded to the tack 130.

Another multilayer capacitor constructed in accordance with the present invention is indicated generally by the reference numeral 140 in FIGURE 10. The capacitor 140 is manufactured by placing a metal foil substrate 141, such as molybdenum, in the reaction chamber and successively depositing a metal boride interlayer 142 and a boron nitride film 144 on the substrate using the process steps heretofore described. A metal film electrode 146 is then deposited on the surface of the boron nitride film 144 preferably by conventional vacuum-evaporation and condensation techniques. The metal film electrode 146 should be chosen so that boron will react with the metal to form a metal boride interlayer by the above described techniques. Molybdenum may be used for the electrode film. Then a second metal boride interlayer 148, a second boron nitride film 150 and a second metal film electrode 152 are successively deposited upon the metal film electrode 146. This sequence of steps may be repeated any number of times to produce additional dielectric and electrode films such as a third metal boride interlayer 154, a third boron nitride film 156 and a third metal film electrode 158. The second metal film electrode 152 may also be molybdenum, as illustrated, in which case the interlayer 154 would be molybdenum boride. However, it will be appreciated that any one of the refractory metals heretofore specified can be used in accordance with the broader aspects of the invention.

An important aspect of the capacitor 140 is that the boron nitride dielectrics 144, 150 and 156 can each be made very thin yet can be made of different thicknesses so as to provide a variety of capacitances in the same device. For example, the boron nitride film 144 might have the least thickness, the boron nitride film 150 a greater thickness, and the boron nitride film 156 the greatest thickness. The thicknesses of the boron nitride films can be controlled with considerable accuracy as previously mentioned, and the total thickness of the films deposited on the substrate might be less than one mil.

Figure 13:
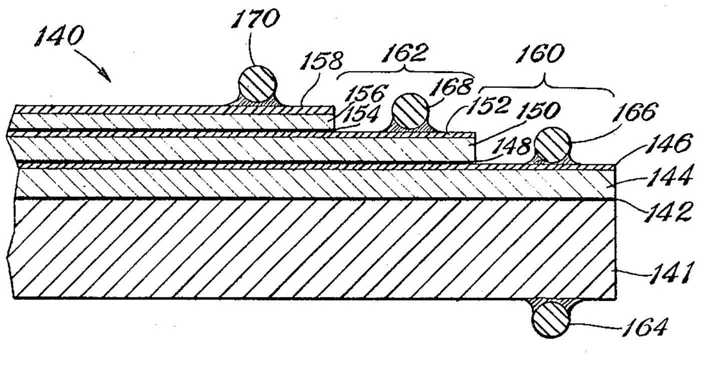
FIGURE 13 is an enlarged, somewhat schematic sectional view of still another capacitor constructed in accordance with the present invention.

Electrical contact can be made with the electrodes of the device 140 in the manner illustrated in the transverse cross section of FIGURE 13 by using either masking or selective etching techniques. When using the masking technique, a relatively long strip of metal foil 141 may be used as the substrate placed in the reaction chamber for deposition of the first interlayer 142, the first boron nitride film 144 and the first metal film electrode 146. Then the area 160 is covered by a suitable mask extending along the entire length of the substrate 141. Then the second interlayer 148, the second boron nitride film 150 and the second metal film electrode 152 are deposited. The area 162 is then covered by additional masking before the third interlayer 154, the third boron nitride film 156 and the third metal film electrode 158 are deposited. Then the masking can be removed and the elongated strip of foil 141 cut transversely into the desired number of capacitor sandwich units. The conductors 164, 166, 168 and 170 can then be welded to the substrate 141 and the first, second, and third metal film electrodes 146, 152 and 158, respectively. The edges of the capacitor can be cleaned by suitable etching material to remove metals which have wiped over the cut edges and would otherwise tend to short out the capacitor. The capacitor can then be encapsulated in a suitable insulating material in a conventional manner, if desired.

The alternative process for attaching the leads to the various electrodes of the capacitor 140 involves the successive and selective etching of the various layers. When using such a technique, the metal film electrodes are preferably of a metal, such as molybdenum, that will not be attacked by the $H_3PO_4$ etchant for boron nitride, but which will be attacked by an etchant in which the boron nitride is stable, such as a solution of HCl-$HNO_3$.

The third metal film electrode 158 is first etched away by HCl-$HNO_3$ to expose the third boron nitride film 156 in both areas 160 and 162. During this step the third boron nitride layer 154 will protect the second metal film electrode 152. Next the third boron nitride film 156 in the areas 160 and 162 is etched away by hot $H_3PO_4$. Then the third metal boride interlayer 154 is etched away in the areas 160 and 162 to expose the second metal film electrode 152 over both areas. The second metal film electrode 152 and the second boron nitride film 150 can then be successively etched away in the area 160 to expose the first metal film electrode 146. The leads 164, 166, 168 and 170 can then be connected by some conventional technique such as welding and the capacitor encapsulated, if desired, by a suitable insulating material.

Another important aspect of the invention is that a micro-circuit comprised of a resistor and a capacitor connected in series can be constructed in accordance with the present invention merely by controlling the thickness and properties of the metallic film electrode. For example, the electrode film 46 in FIGURE 3 could be a high resistance metal such as tantalum rather than aluminum. The thickness of the metal film can be accurately controlled by controlling the parameters of the vapor phase deposition process so that a resistance of the desired value can be attained. The capacitor formed by the substrate 40, the boron nitride film dielectric 44 and the electrode film 46 is then connected in series with the resistor formed by the metal film.

From the above description, it will be evident to those skilled in the art that a novel and highly useful process for manufacturing electrical capacitors comprised of dense, continuous, pure and flexible dielectric layers which are strongly adherent to metal foil substrates, has been described. The boron nitride is a material which has not heretofore been available in this form and in such thin films. Further, a novel process has been described for manufacturing multilayer capacitors of a size, quality, and character heretofore unobtainable. The boron nitride dielectric films of the novel capacitors of this invention ranged in thickness from 0.2 to 5 m. microns in thickness. The boron nitride films are very uniform and are continuously bonded to the substrate by the interlayer. The boron nitride films exhibited a dielectric strength of 200 volts DC per micron of thickness and 5000 volts DC per mil thickness at room temperature. A calculated capacitance of 50,000 micromicrofarads per square inch for a 0.5 micron thick boron nitride film has been exhibited. The boron nitride films are stable in air up to 800° C. and can protect the substrate metal against oxidation. The boron nitride film is stable in most acids and alkalis including aqua regia, HF-$HNO_3$ and NaOH. Therefore, the novel capacitors can be used in high temperatures even in the presence of otherwise deleterious ambients. However, we have discovered that hot $H_3PO_4$ will attack the boron nitride film at a rapid rate such that novel selective etching techniques can be used in the construction of capacitors.

Although preferred embodiments of the present invention have been described in detail, it is to be understood that various changes, substitutions and alterations can be made therein without departing from the spirit and scope of the invention as defined by the appended claims.

What is claimed is:

1. A process for manufacturing an electrical capacitor comprising the steps of:

adherently depositing a pure boron nitride film on a metal electrode over a boron-metal interlayer which is chemically bonded to said metal electrode and
depositing an electrode film on the boron nitride film.

2. A process for manufacturing an electrical capacitor comprising the steps of:

forming a metal boride interlayer on a metal electrode by reacting boron with the metal electrode,
depositing a boron nitride film on the interlayer, and
depositing an electrode film on the boron nitride film.

3. A process for manufacturing an electrical capacitor comprising the steps defined in claim 2 wherein:

the metal boride interlayer is formed by heating the metal to a temperature in the range of 900–1300° C. in the presence of a boron halide,
the boron nitride film is deposited by heating the metal to a temperature in the range of 900–1300° C. in the presence of reagents containing boron and nitrogen, and
the electrode film is deposited by vapor phase condensation.

4. A process for manufacturing an electrical capacitor comprising the steps of:

masking an area of a metal electrode,
forming a metal boride interlayer on the unmasked area of the metal electrode by reacting boron with the metal electrode,
depositing a boron nitride film on the interlayer,
depositing a metallic electrode film on the boron nitride film, and
removing the masking to make electrical contact with the metal electrode.

5. A process for manufacturing an electrical capacitor comprising the steps of:

chemically bonding a boron nitride film to the surface of a metal foil by an interlayer,
removing a portion of the boron nitride by applying hot phosphoric acid to permit electrical contact to be made with the metal foil, and
depositing an electrode film on the boron nitride film.

6. A process for manufacturing an electrical capacitor comprising the steps of:

forming a first interlayer on a first metal electrode by reacting a reagent with the metal,
adherently depositing a first boron nitride film on the first interlayer,
adherently depositing a second metal electrode film on the first boron nitride film,
forming a second interlayer on the second metal electrode film by reacting a reagent with the metal of the electrode film,
adherently depositing a second boron nitride film on the second interlayer, and
depositing a third metal electrode film on the second boron nitride film.

7. A process for manufacturing an electrical capacitor comprising the steps defined in claim 6 wherein:

the first and second boron nitride films are of different thicknesses.

8. A process for manufacturing a multilayer electrical capacitor comprising the steps of:

forming a first metal boride interlayer on a first metal electrode by reacting boron with the metal,
depositing a first boron nitride film on the first interlayer,
depositing a second metal electrode film on the first boron nitride film,
masking a contact area of the second metal electrode film,
forming a second metal boride interlayer of the second metal electrode film except for the masked first area,
depositing a second boron nitride film on the second metal boride interlayer,
depositing a third metal electrode film on the second metal boride interlayer,
removing the mask over the contact area to expose the second metal electrode, and
attaching electrical leads to the first metal electrode, the exposed area of the second metal electrode and the third metal electrode film.

9. A process for manufacturing a multilayer electrical capacitor comprising the steps of:

sequentially depositing a first boron nitride film, a first metallic electrode film, a second boron nitride film and a second metallic electrode film on a metal substrate, removing the second metallic electrode film in a first area to expose the second boron nitride film, and removing the exposed second boron nitride film by etching with a hot solution of phosphoric acid to expose the first metallic electrode film such that electrical contact can be made therewith.

10. A process for manufacturing a multilayer electrical capacitor comprising the steps of:

simultaneously forming an interlayer on both sides of a metal foil substrate by reacting a reagent with the metal at a high temperature, simultaneously depositing a boron nitride film on each of the interlayers, and simultaneously depositing metallic electrode films on each of the boron nitride films.

11. A process for manufacturing a multilayer electrical capacitor comprising the steps defined in claim 10 further characterized by the steps of:

forming an aperture in the metal foil prior to the deposition of the boron nitride films, and making electrical contact between the electrode films by means of a conductor passing through the aperture and attached to the electrode films.

12. A process for manufacturing a multilayer electrical capacitor comprising the steps of:

forming an interlayer on both sides of a metal foil substrate by reacting a reagent with the metal at a high temperature, depositing a boron nitride film on each of the interlayers, depositing metallic electrode films on each of the boron nitride films, selectively removing a portion of the edge of the metal foil such that the edges of the boron nitride films extend beyond the edges of the metal foil, selectively removing a portion of the edges of the boron nitride and metal electrode films to expose a portion of the edge of the metal foil, and attaching an electrical lead to the metal foil and an electrical lead to the metallic electrode films.

13. A process for manufacturing a multilayer electrical capacitor comprising the steps defined in claim 12 wherein:

the metal foil is molybdenum, and the boron nitride films are removed by hot phosphoric acid.

14. A process for etching boron nitride comprising the step of:

applying hot phosphoric acid to the boron nitride.

15. A process for etching boron nitride comprising the step of:

applying a phosphoric acid solution at about 295° C. to the boron nitride.

16. A process for manufacturing an electrical capacitor comprising the steps of:

forming a metal boride interlayer on a metal electrode by reacting boron with the electrode, depositing a boron nitride film on the interlayer, depositing an electrode film on the boron nitride film, and selectively etching the electrode film, the boron nitride film and the metal boride interlayer away to make electrical contact with the metal electrode.

References Cited

UNITED STATES PATENTS

| | | | |
|---|---|---|---|
| 2,627,645 | 2/1953 | Harris | 29—25.42 |
| 2,915,808 | 12/1959 | Clemons | 29—25.42 |
| 2,682,024 | 6/1954 | Kohman | 317—258 |
| 2,711,498 | 6/1955 | Robinson | 317—258 |
| 3,227,934 | 1/1966 | Schill | 117—212 X |

FOREIGN PATENTS

| | | |
|---|---|---|
| 908,860 | 10/1962 | Great Britain. |

WILLIAM L. JARVIS, *Primary Examiner.*